(12) United States Patent
Wall et al.

(10) Patent No.: US 11,124,059 B2
(45) Date of Patent: Sep. 21, 2021

(54) MULTIPLE INLET FILTRATION SYSTEM

(71) Applicant: K&N Engineering, Inc., Riverside, CA (US)

(72) Inventors: Jere James Wall, Helendale, CA (US); Steve Williams, Beaumont, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 16/173,489

(22) Filed: Oct. 29, 2018

(65) Prior Publication Data
US 2020/0130502 A1 Apr. 30, 2020

(51) Int. Cl.
| | |
|---|---|
| *B60K 13/02* | (2006.01) |
| *B60K 13/06* | (2006.01) |
| *F02M 35/02* | (2006.01) |
| *F02M 35/024* | (2006.01) |
| *F02M 35/10* | (2006.01) |
| *F02M 35/16* | (2006.01) |
| *B60H 1/28* | (2006.01) |

(52) U.S. Cl.
CPC .............. *B60K 13/02* (2013.01); *B60K 13/06* (2013.01); *F02M 35/0201* (2013.01); *F02M 35/02433* (2013.01); *F02M 35/10013* (2013.01); *F02M 35/161* (2013.01); *B60H 1/28* (2013.01)

(58) Field of Classification Search
CPC .. B60K 13/02; B60K 13/06; F02M 35/02433; F02M 35/10013; F02M 35/0201; F02M 35/161; B60H 1/28
See application file for complete search history.

(56) References Cited

U.S. PATENT DOCUMENTS

| | | | |
|---|---|---|---|
| 2010/0083928 A1* | 4/2010 | Saito | F02M 35/02 123/184.56 |
| 2010/0147243 A1* | 6/2010 | Stec | F02M 35/10013 123/184.21 |
| 2017/0001502 A1* | 1/2017 | Daio | B60J 10/25 |

FOREIGN PATENT DOCUMENTS

| | | | | |
|---|---|---|---|---|
| CN | 204567268 U | * | 8/2015 | |
| DE | 202016100369 U1 | * | 3/2016 | ........... F02M 35/108 |

* cited by examiner

Primary Examiner — Jacob M Amick
Assistant Examiner — Charles J Brauch
(74) Attorney, Agent, or Firm — Rutan & Tucker LLP; Hani Z. Sayed

(57) ABSTRACT

An apparatus and a method are provided for a multiple inlet air box to communicate an airstream through an air filter to an air intake duct of an internal combustion engine of a vehicle. The multiple inlet air box is comprised of a housing that supports the air filter within an interior of the housing. A mount portion within the housing fixedly receives a base of the air filter. Multiple air inlets couple with corresponding air inlet ports of the vehicle to direct the airstream into the multiple inlet air box. A duct directs the airstream from the multiple air inlets to the interior of the housing. A conduit communicates the airstream from an interior of the air filter to the air intake duct of the internal combustion engine.

13 Claims, 4 Drawing Sheets

MULTIPLE INLET FILTRATION SYSTEM

FIELD

The field of the present disclosure generally relates to filtration devices. More particularly, the field of the present disclosure relates to an apparatus and a method for a multiple inlet air box which exhibits improved air flow and may be coupled with a reusable air filter so as to improve engine performance and fuel economy.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and with engines.

Air filters may be used in automobiles, trucks, tractors, locomotives, and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally, the air intakes of internal combustion engines and compressors tend to use paper, foam, or cotton filters. Some filters use an oil bath. Air filters for internal combustion engines prevent abrasive particulate matter from entering the combustion cylinders of the engine, wherein the particulate matter would cause mechanical wear and oil contamination. Many fuel injected engines utilize a flat panel, pleated paper filter element. This filter usually is placed inside an enclosed, plastic box connected to a throttle body by way of ductwork. Vehicles that use carburetors or throttle body fuel injection systems typically use a cylindrical air filter positioned above the carburetor or the throttle body.

A drawback to conventional air boxes that require flat panel paper filters is that as particular matter builds up in the filter, air flow through the filter becomes restricted. Such a restricted air flow generally leads to a reduction in engine performance, such as a decrease in engine power output and a greater fuel consumption. Moreover, as the paper filter becomes increasingly clogged, pressure below the filter decreases while the atmospheric air pressure outside the filter remains the same. When the difference in pressure becomes too great, contaminants may be drawn through the paper filter directly into the engine. Thus, the ability of the paper filter to protect the engine from contamination and internal damage tends to decrease near the end of the filter's service life. Typically, paper air filters are removed from the vehicle and discarded, and a new paper air filter is then installed. Considering that there are millions of vehicles throughout the world, the volume of discarded air filters that could be eliminated from landfills is a staggering number.

Another drawback to conventional air boxes is that they typically draw air through a tortuous path of hoses or ductwork before the air enters the intake of the engine. In some cases, the air box is a greater source of air restriction than is the paper filter. Similar to a contaminated air filter, a restrictive air box decreases engine performance and fuel economy. What is needed, therefore, is an air box which exhibits improved air flow and may be coupled with a reusable air filter so as to improve engine performance and fuel economy.

SUMMARY

An apparatus and a method are provided for a multiple inlet air box configured to communicate an airstream through an air filter to an air intake duct of an internal combustion engine of a vehicle. The multiple inlet air box is comprised of a housing that supports the air filter within an interior of the housing. A mount portion comprising the housing fixedly receives a base of the air filter. Multiple air inlets are configured to couple with corresponding air inlet ports of the vehicle to direct the airstream into the multiple inlet air box. A duct conveys the airstream from the multiple inlets to the air filter within the interior of the housing. A conduit communicates the airstream from an interior of the air filter to the air intake duct of the internal combustion engine.

In an exemplary embodiment, an air box configured to communicate an airstream through an air filter to an air intake duct of an internal combustion engine of a vehicle comprises a housing configured to support the air filter within an interior of the housing; a duct configured to direct the airstream to the air filter; one or more air inlets to the duct that are configured to couple with one or more corresponding air inlet ports of the vehicle; and a conduit configured to communicate the airstream from an interior of the air filter to the air intake duct.

In another exemplary embodiment, either of the one or more air inlets may be blocked to the airstream so as to facilitate coupling and operation of the air box with the engine of a vehicle comprising only one corresponding air inlet port. In another exemplary embodiment, each of the one or more air inlets comprises an opening having a size, shape, and orientation that substantially matches the size, shape, and orientation of the one or more corresponding air inlet ports to which each of the one or more air inlets is to be coupled. In another exemplary embodiment, the one or more air inlets are configured to be slightly larger than the one or more corresponding air inlet ports, such that the one or more air inlets may receive the one or more corresponding air inlet ports. In another exemplary embodiment, the one or more air inlets are configured to be substantially the same size as the one or more corresponding air inlet ports, such that the one or more air inlets may be aligned with, and pressed against the one or more corresponding air inlet ports. In another exemplary embodiment, the one or more air inlets are configured to be slightly smaller than the one or more corresponding air inlet ports, such that the one or more air inlets may be inserted into the one or more corresponding air inlet ports. In another exemplary embodiment, a specific configuration of the air inlets may be varied so as to accommodate a particular make, model, and configuration of the engine for which the air box is to be utilized.

In another exemplary embodiment, a seal is disposed around a perimeter edge of each of the one or more air inlets so as to establish a substantially air-leak resistant junction between the one or more air inlets and the one or more corresponding air inlet ports. In another exemplary embodiment, the seal is comprised of a molded pliable strip including a recess that is configured to receive the perimeter edge. In another exemplary embodiment, the molded pliable strip is comprised of a cross-sectional shape that is suitable to establish the substantially air-leak resistant junction. In another exemplary embodiment, the seal is comprised of pliable stripping that is configured to be disposed around an interior of the perimeter edge, such that the pliable stripping fills a space between an interior of each of the one or more air inlets and an exterior of the one or more corresponding air inlet ports. In another exemplary embodiment, the seal is comprised of pliable stripping that is configured to be disposed on an exterior of each of the one or more air inlets, such that the pliable stripping fills a space between the exterior of each of the one or more air inlets and an interior of the one or more corresponding air inlet ports.

In an exemplary embodiments, a method for an air box to communicate an airstream through an air filter to an air intake duct of an internal combustion engine of a vehicle comprises configuring a housing to support the air filter within an interior of the housing; configuring a duct to direct the airstream to the air filter; forming one or more air inlets to the duct; providing a configuration and orientation to each of the one or more air inlets to facilitate coupling with one or more corresponding air inlet ports of the vehicle; and extending a conduit from an interior of the air filter to the air intake duct.

In another exemplary embodiment, forming one or more air inlets further comprises disposing a seal around a perimeter edge of the one or more air inlets so as to establish a substantially air-leak resistant junction between the one or more air inlets and the one or more corresponding air inlet ports. In another exemplary embodiment, providing a configuration and orientation further comprises configuring either of the one or more air inlets to be blocked to the airstream so as to facilitate operation of the air box in a vehicle that lacks either of the one or more corresponding air inlet ports.

BRIEF DESCRIPTION OF THE DRAWINGS

The drawings refer to embodiments of the present disclosure in which.

Figure 1:
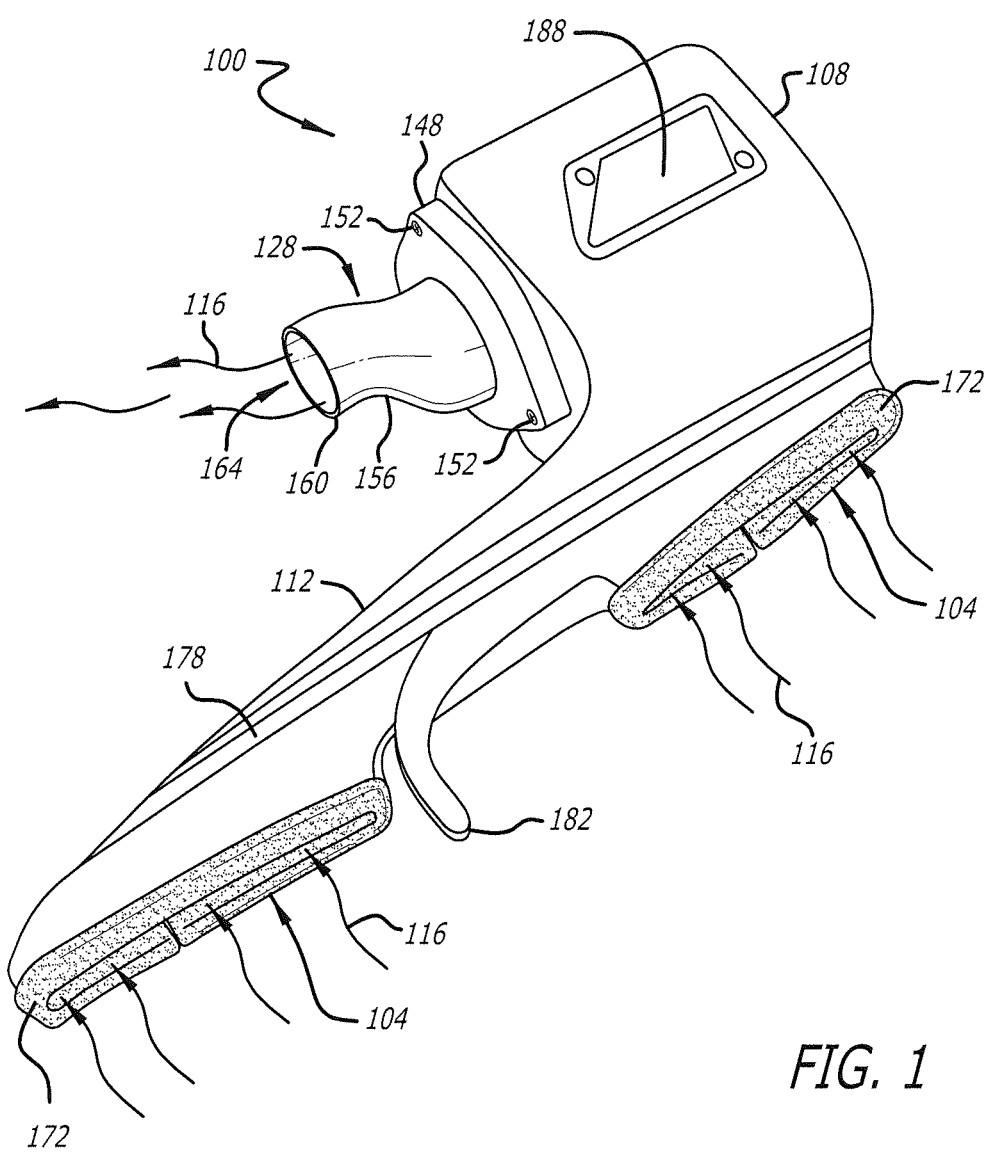
FIG. 1 illustrates an upper perspective view of an exemplary embodiment of a multiple inlet air box in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first air inlet," may be made. However, the specific numeric reference should not be interpreted as a literal sequential order but rather interpreted that the "first air inlet" is different than a "second air inlet." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a multiple inlet air box configured to communicate an airstream through an air filter to an air intake duct of an internal combustion engine of a vehicle. The multiple inlet air box is comprised of a housing that is configured to support the air filter within an interior of the housing. A mount portion is disposed within the housing and configured to fixedly receive a base of the air filter. Hardware fasteners may be coupled with the base of the air filter to affix the air filter to an inner surface of the mount portion, forming a leak resistant coupling there between. A conduit is configured to communicate the airstream from an interior of the air filter to the air intake duct of the internal combustion engine. One or more air inlets to the interior of the housing are configured to couple with corresponding air inlet ports of the vehicle so as to direct the airstream into the multiple inlet air box. A duct passes the airstream from the air inlets to the interior of the housing. An opening disposed on a bottom portion of the housing is configured to receive either a flat panel to enclose the interior of the housing or an electronic control unit (ECU) of the vehicle such that the ECU is placed into contact with the airstream and is cooled thereby.

Although embodiments of the invention may be described and illustrated herein in terms of a cone-shaped air filter, it should be understood that embodiments of this invention are not limited to the exact shape illustrated, but rather may include a wide variety of generally enclosed shapes, such as cylindrical, circular, oval, round, curved, conical, or any other closed perimeter shape, that provide a relatively large surface area in a given volume of the filter. Moreover, embodiments as described herein are not limited to use as internal combustion engine filters, but rather may have applicability in other filtration systems in which a large volume of air requires treatment.

Figure 2:
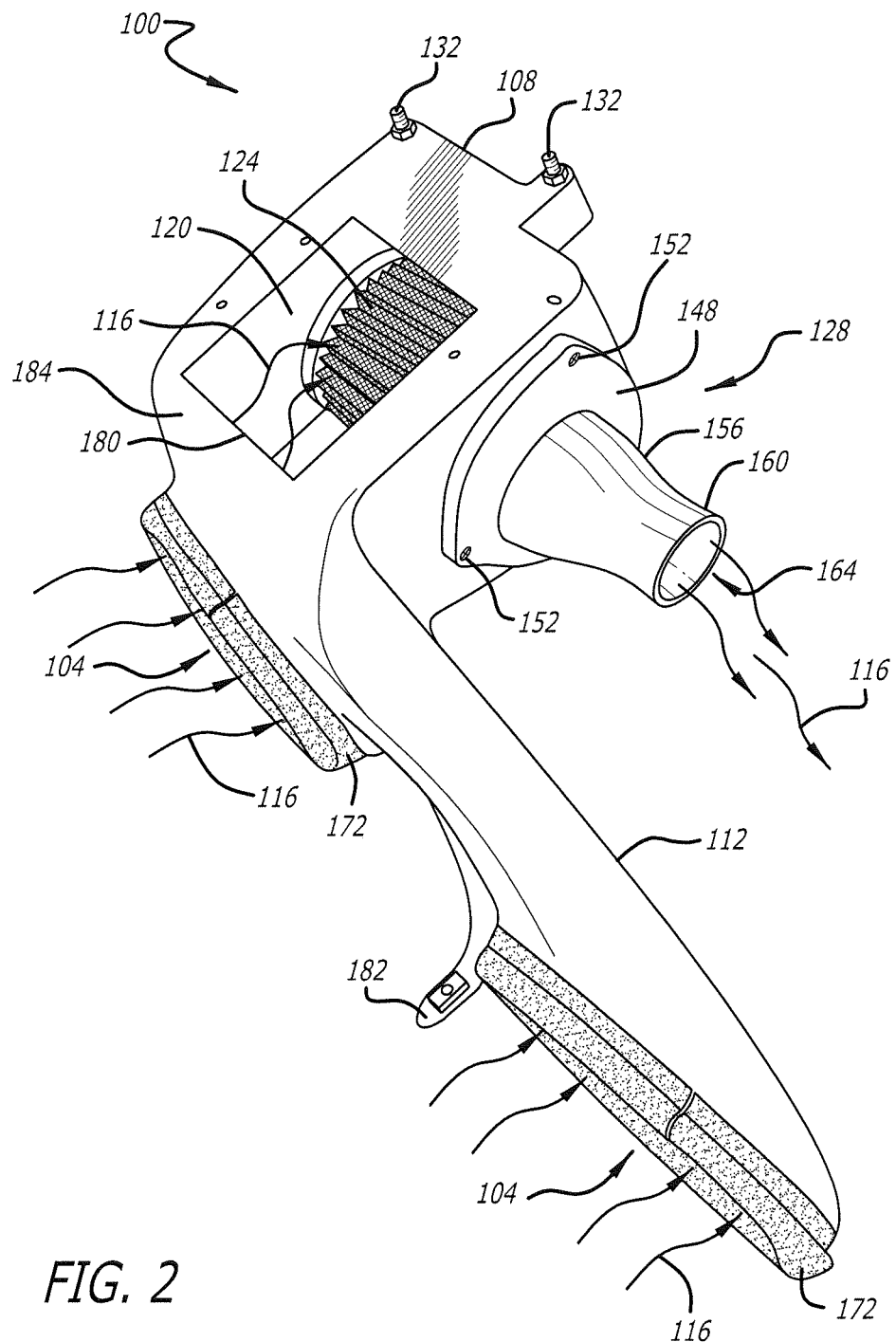
FIG. 2 illustrates a lower perspective view of the exemplary multiple inlet air box of FIG. 1, according to the present disclosure.

FIG. 1 illustrates an upper perspective view of an exemplary embodiment of a multiple inlet air box 100 in accordance with the present disclosure. The multiple inlet air box 100 is comprised of one or more air inlets 104 that are connected to a housing 108 by way of a duct 112. The duct 112 is configured to communicate an airstream 116 entering through the air inlets 104 into an interior 120 of the housing 108. As best illustrated in FIG. 2, an air filter 124 disposed within the interior 120 is configured to remove particulate matter and contaminants that may be flowing with the airstream 116 before the airstream is directed through a conduit 128 to an air intake duct of the internal combustion engine. The multiple inlet air box 100 generally is of an enclosed variety and is configured to improve movement of the airstream 116 through the air filter 124 disposed within the interior 120 of the housing 108. Preferably, the interior 120 is characterized by smooth surfaces and rounded edges so as to decrease turbulence and air resistance through the multiple inlet air box 100, thereby improving engine performance beyond that otherwise possible with conventional air boxes.

The housing 108 and the duct 112 preferably are comprised of a material that is sufficiently durable and temperature resistant to retain their configurations during installation and operation when coupled with the air intake duct of the engine. In some embodiments, the housing 108 and duct 112 may be formed as a single component by way of injection molding. In some embodiments, the housing 108 and the duct 112 may be formed as separate components that may be coupled together during installation of the multiple inlet air box 100 into a vehicle. It is envisioned that either or both of the housing and the duct 112 may be formed by way of injection molding.

Figure 3:
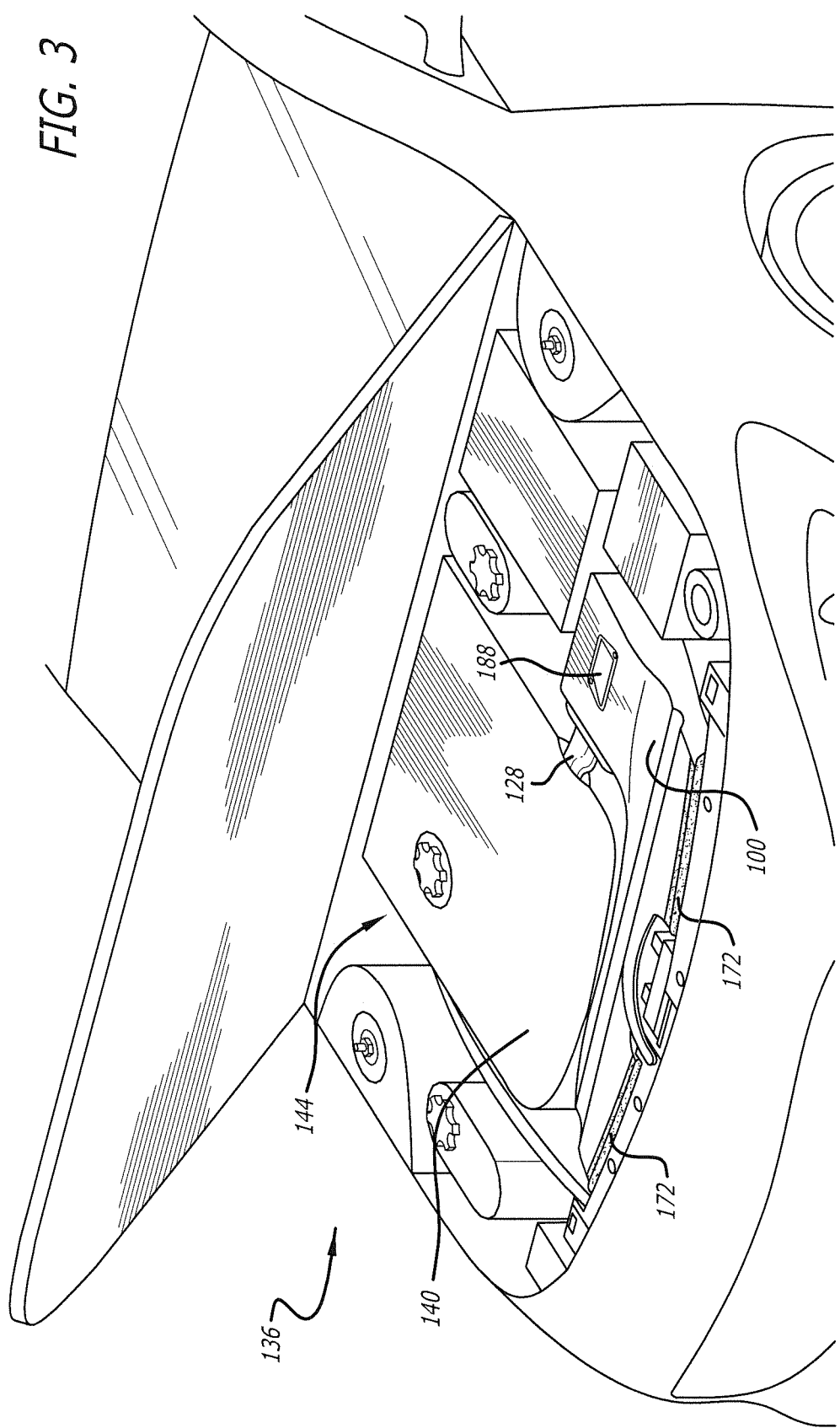
FIG. 3 illustrates a perspective view of an engine bay wherein an exemplary embodiment of a multiple inlet air box is coupled with an engine, according to the present disclosure.
Figure 4:
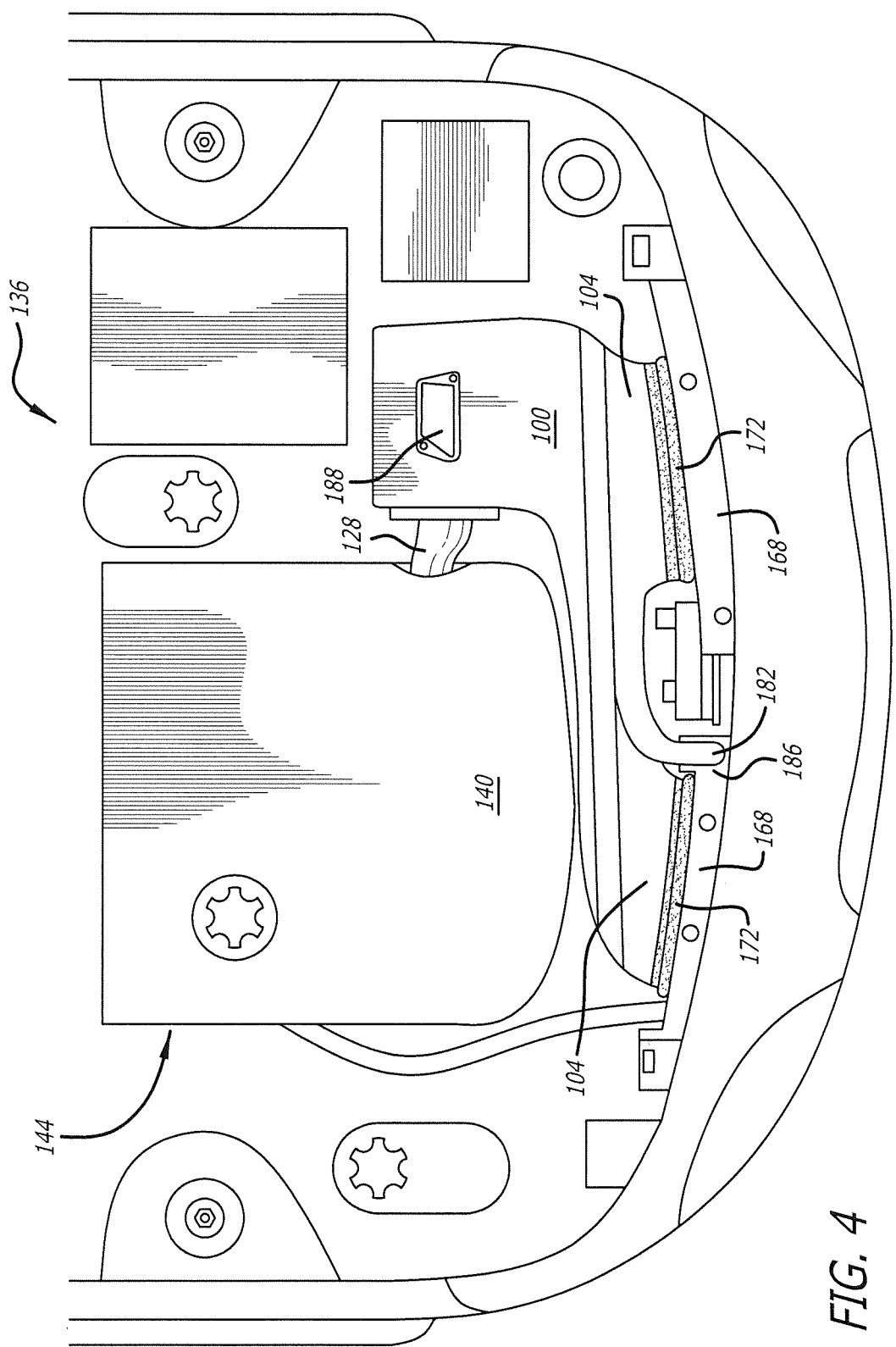
FIG. 4 illustrates a top view of the engine bay of FIG. 3 wherein the multiple inlet air box is coupled with air inlet ports disposed within the engine bay in accordance with the present disclosure.

In some embodiments, one or more supports may be disposed on the housing 108 and the duct 112 so as to fixate the multiple inlet air box 100 within the engine bay of a vehicle. In the illustrated embodiment of FIGS. 1-2, rear supports 132 are configured to be coupled with, or fastened to, the interior of an engine bay 136 of a vehicle, as shown in FIGS. 3-4, such that the conduit 128 may be coupled with an air intake duct 140 of an engine 144. In some embodiments, the rear supports 132 may be configured to couple the multiple inlet air box 100 directly with the engine 144 of the vehicle. It is envisioned that the rear supports 132 may include any suitable fastening means to facilitate installing the multiple inlet air box 100 in the engine bay 136, such as, by way of example, suitably designed holes, brackets, molded shaped portions, protrusions, extensions, straps, hardware fasteners, or other any similar device for holding the multiple inlet air box 100 fixed within the engine bay 136. As will be appreciated, the particular fastening means will vary according to the specific make, model, and type of the vehicle with which the multiple inlet air box 100 is to be used.

The housing 108 is configured to support the air filter 124 and provide an interface between the air filter and the air intake duct 140 of the engine 144. A front side of the housing 108 is comprised of a mount portion 148 that is configured to facilitate coupling the air filter 124 with an interior surface of the front side of the housing. In some embodiments, the air filter 124 may be of a flangeless variety, and thus the base may include a compressible seal. In the embodiment illustrated in FIGS. 1-2, the mount portion 148 is comprised of a flat surface that receives the seal of the air filter 124. A multiplicity of fasteners 152, or other suitable hardware, may be used to compress the seal between the base of the air filter 124 and the flat surface, thereby establishing an air-leak resistant connection between an interior of the air filter 124 and the mount portion 148. Further details about components comprising the base of the air filter 124, including seals disposed thereon, are disclosed in U.S. patent application Ser. No. 15/276,502, entitled "Flangeless Air Filter," filed on Sep. 26, 2016, the entirety of which is incorporated herein by reference. In some embodiments, however, the mount portion 148 may be comprised of a suitably sized flange or conduit that extends into the interior 120 and is configured to be received into an opening in the base of the air filter 124. It is contemplated that the mount portion 148 may be comprised of any coupling means suitable for forming a reasonably air-leak resistant connection between the air filter 124 and the mount portion 148.

With reference to FIG. 2, the mount portion 148 places the interior of the air filter 124 into fluid communication with the conduit 128. The conduit 128 is configured to convey the airstream 116 from the interior of the air filter 124 to the air intake duct 140 of the engine 144. The conduit 128 is comprised of a transition 156 and a flange 160 that is configured to receive the air intake duct 140. Preferably, the transition 156 provides a molded connection between the flange 160 and the housing 108, although other forms of connections may be apparent to those skilled in the art. In the embodiment of FIG. 2, the transition 156 generally positions a longitudinal dimension of the flange 160 at an offset with respect to a center of the mount portion 148. In some embodiments, the transition 156 may position the longitudinal dimension of the flange 160 at an angle relative to the housing 108. In some embodiments, the angle between the conduit 128 and the housing 108 may be 90-degrees. In general, however, the value of the angle between the conduit 128 and the housing 108 will depend upon the particular vehicle, as well as the specific configuration of the engine, for which the multiple inlet air box 100 is to be utilized. As such, any value of the angle and the offset of the conduit 128 may be incorporated into the multiple inlet air box 100 without detracting from the present disclosure.

The flange 160 comprises an opening 164 that is configured to conduct the airstream 116 from the interior of the air filter 124 to the air intake duct 140. It should be understood that the flange 160 has a configuration and an exterior diameter, and the opening 164 has an inner diameter that are suitable for coupling with the air intake duct 140 of the engine 144. As shown in FIGS. 1-2, exterior diameter of the transition 160 may taper along the length of the conduit 128 to a suitable exterior diameter of the flange 160. Moreover, in some embodiments, the flange 160 may comprise any of various additional ridges, raised portions, or other surface features so as to optimally engage with the air intake duct 140. The specific configuration of the flange 160 and the inner diameter of the opening 164 will depend upon the particular make, model, and engine configuration for which the multiple inlet air box 100 is to be utilized, and thus a wide variety of configurations and diameters may be incorporated into the conduit 128, without limitation.

As best illustrated in FIG. 4, each of the air inlets 104 is configured to be coupled with an air inlet port 168 disposed within the engine bay 136. As will be recognized, the air inlet ports 168 generally extend through the vehicle to a source of external air, such as a front of the vehicle. Each air inlet 104 comprises an opening having a size, shape, and orientation that substantially match the size, shape, and orientation of the particular air inlet port 168 to which the air inlet 104 is to be coupled. In some embodiments, the air inlets 104 may be configured to be slightly larger than the air inlet ports 168, such that the air inlets 104 may receive the air inlet ports 168 into an interior of the air inlets. In some embodiments, the air inlets 104 may be configured to be substantially the same size as the air inlet ports 168, such that the air inlets 104 may be aligned with, and pressed against the air inlet ports 168. Still, in some embodiments, the air inlets 104 may be configured with a size and shape that is slightly smaller than the size and shape of the air inlet ports 168, such that the air inlets 104 may be inserted into the interior of the air inlet ports 168. It is contemplated that any of various suitable hardware fasteners may be utilized to couple the air inlets 104 with the air inlet ports 168. It is further contemplated that any of various additional bends, ridges, raised portions, or other surface features may be incorporated into the air inlets 104 so as to optimally engage with the air inlet ports 168 of the vehicle. As such, the specific configuration of the air inlets 104 will depend upon the particular make, model, and configuration of the engine 144 for which the multiple inlet air box 100 is to be utilized, without limitation, and without deviating beyond the spirit and scope of the present disclosure.

In the embodiment illustrated in FIGS. 1-4, a seal 172 is disposed around a perimeter edge of each of the air inlets 104. The seal 172 serves to establish a substantially air-leak resistant junction between the air inlet port 168 and the air inlet 104. In some embodiments, the seal 172 is comprised of a molded pliable strip that may be pressed onto the perimeter edge of the air inlet 104, as shown in FIGS. 1-2. The molded pliable strip may include a recess that is configured to fixedly receive the perimeter edge of the air inlet 104, such that the seal 172 remain fixed to the perimeter of the air inlet. The seal 172 may be comprised of any cross-sectional shape that is suitable for sealing the junction between the air inlet 104 and the air inlet port 168.

In some embodiments, the seal 172 may be comprised of pliable stripping that is configured to be disposed between an interior of the perimeter edge of the air inlet 104 and an exterior of the air inlet port 168. The pliable stripping may be affixed to either the air inlet 104 or the air inlet port 168 by way of a suitable adhesive or any of various fasteners. In some embodiments, wherein the air inlets 104 are configured to be received into the air inlet ports 168, the pliable stripping may be affixed between the interior of the air inlet port 168 and the exterior of the air inlet 104.

It should be understood that the number of air inlets 104 comprising the multiple inlet air box 100 is not to be limited to two air inlets, as shown in the illustrated embodiment of FIGS. 1-4. Although some vehicles include two air inlet ports 168, as shown herein, other similar vehicles may be limited to solely either one of the two air inlet ports 168, discussed herein. It is contemplated, therefore, that either one of the air inlets 104 may be blocked to the airstream 116, as needed, during installing of the multiple inlet air box 100 into the engine bay 136. Any of various mechanical devices may be used to block either of the air inlets 104, such as, by way of non-limiting example, baffles, end caps, slats, panels, and the like. In some embodiments, either one of the air inlets 104 may be omitted from the multiple inlet air box 100 so as to accommodate a target vehicle that lacks the corresponding air inlet port 168, without limitation.

In some embodiments, the housing 108 and the duct 112 may include any of various surface features or contours that are configured to provide clearance with nearby components disposed on the engine 144 or elsewhere within the engine bay 136. For example, as best shown in FIG. 2, the duct 112 includes a longitudinal groove 178 configured to provide clearance for a hood prop (not shown) when the hood of the vehicle is closed. Further, a front support 182 is disposed on the duct 112 forwardly of the air inlets 104. The front support 182 is configured to be received by a mounting portion 186 of the engine bay 136 so as to maintain the air inlets 104 engaged with the air inlet ports 168, as described herein. It should be understood that a wide variety of surface features, contoured portions, and suitable supports may be coupled with the multiple inlet air box 100, without limitation.

It is contemplated that a wide variety of peripheral components may be coupled with the housing 108 and the duct 112, as needed. In some embodiments, for example, one or more sheet metal components may be fastened onto locations of the duct 112 that are near heated components within the engine bay 136, such as an exhaust manifold of the engine 144. In some embodiments, one or more pliable pads may be strategically located on the exterior of the housing 108 and the duct 112 so as to cushion contact with nearby components within the engine bay 136. It is envisioned that the pliable pads may be comprised of rubber suitable to reduce vibrations occurring between the multiple inlet air box 100 and the nearby components. In some embodiments, a latch mechanism may be installed within the longitudinal groove 178 and configured to retain the hood prop when the hood of the vehicle is closed. It should be understood that a wide variety of components or devices may be coupled with the multiple inlet air box 100 so as to facilitate operation of the multiple inlet air box within the engine bay 136 and in connection with the engine 144, without limitation.

Referring again to FIG. 2, the housing 108 comprises an opening 180 into the interior 120. The opening 180 comprises an edge portion 184 that is configured to be coupled with a flat panel (not shown) so as to enclose the interior 120. In some embodiments, the edge portion 184 may be configured to be coupled with a flat surface of an engine control unit (ECU), such that the flat surface of the ECU encloses the interior 120. In such embodiments, the flat surface of the ECU may be placed into direct contact with the airstream 116, such that the airstream transfers heat away from the ECU before being drawn through the air filter 124 and into the air intake duct 140 of the engine 144. Further details about coupling an ECU with the multiple inlet air box 100 so as to cool the ECU are disclosed in U.S. patent application Ser. No. 16/172,769, entitled "Engine Control Unit Cooling Air Box," filed on Oct. 27, 2018, the entirety of which is incorporated herein by reference.

The edge portion 184 preferably is configured to receive a multiplicity of fasteners so as to fixedly attach either the ECU or the flat panel to the housing 108. In some embodiments, a multiplicity of threaded holes may be disposed in suitable locations within the edge portion 184 to threadably receive the multiplicity of fasteners. Further, a suitable gasket or a seal may be disposed between the ECU or flat panel and the edge portion 184 so as to prevent outside air other the airstream 116 from entering the interior 120. It should be understood, however, that the ECU or the flat panel may be fixedly coupled with any suitable surface of the housing 108 by way of any of various fastening means, without limitation.

It is contemplated that the opening 180 facilitates installing and removing the air filter 124 from the housing 108, as needed. For example, once the air filter 124 is dirty, the air filter may be removed from the housing and a new, clean air filter 124 may be installed. A transparent portion 188, as shown in FIG. 1, disposed on a top of the housing 108 facilitates direct observation of the condition of the air filter 124. In one embodiment, a method for removing the air filter 124 comprises removing the above-mentioned flat panel or ECU from the edge portion 184 to provide access to the interior 120 of the housing 108. The fasteners 152 may then be loosened to release the base of the air filter 124 from the mount portion 148. Once the fasteners 152 are removed, the air filter 124 may be removed from the interior 120 by way of the opening 180.

Although the method for removing the air filter 124 generally facilitates replacing the air filter, when dirty, with a clean air filter, it is contemplated that the method for removing the air filter 124 is particularly advantageous for use with embodiments of the air filter 124 that are configured to be periodically cleaned and reused. For example, in some embodiments, the air filter 124 may be comprised of multiple layers of cotton gauze that are treated with a filter oil composition that enhances the filtration properties of the air filter. It is contemplated that a practitioner may clean the air filter 124 by first removing from the air filter from the housing 108, as described above, and then applying a solvent to remove the filter oil from the air filter 124. The practitioner may clean the air filter 124 by inserting a water hose through the base and into the interior of the air filter 124 and spraying water so as to flush contaminants from the air filter. Further details about components comprising the air filter 124, as well as details about the filter oil composition and periodic cleaning of the air filter, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims

What is claimed is:

1. An air box configured to communicate an airstream through an air filter to an air intake duct of an internal combustion engine of a vehicle, comprising:
    a housing configured to support the air filter within an interior of the housing, the housing comprising:
        a transparent portion that is disposed on a top of the housing to observe the air filter; and
        an edge portion coupled with a flat surface of an engine control unit, such that the ECU is placed in direct contact with the airstream;
    a duct configured to direct the airstream to the air filter;
    a plurality of air inlets to a singular duct that are configured to couple with one or more corresponding air inlet ports of the vehicle, and a seal disposed around the perimeter of the air inlets to establish an air-leak resistant junction between the air inlet port and the air inlet, wherein a first air inlet and a second air inlet each communicate air to the duct prior to the air entering the interior of the housing; and
    a molded pliable strip seal disposed around a perimeter edge of each of the plurality of air inlets so as to establish a substantially air-leak resistant junction between the plurality of air inlets and the one or more corresponding air inlet ports;
    the molded pliable strip seal having a cross-sectional shape that is suitable to establish the substantially air-leak resistant junction; and
    a conduit configured to communicate the airstream from the interior of the housing to the air intake duct.

2. The air box of claim 1, wherein either of the plurality of air inlets may be blocked to the airstream so as to facilitate coupling and operation of the air box with the engine of a vehicle comprising only one corresponding air inlet port.

3. The air box of claim 1, wherein each of the plurality of air inlets comprises an opening having a size, shape, and orientation that substantially matches the size, shape, and orientation of the one or more corresponding air inlet ports to which each of the plurality of air inlets is to be coupled.

4. The air box of claim 3, wherein the plurality of air inlets are configured to be slightly larger than the one or more corresponding air inlet ports, such that the plurality of air inlets may receive the one or more corresponding air inlet ports.

5. The air box of claim 3, wherein the plurality of air inlets are configured to be substantially the same size as the one or more corresponding air inlet ports, such that the plurality of air inlets may be aligned with, and pressed against the one or more corresponding air inlet ports.

6. The air box of claim 3, wherein the plurality of air inlets are configured to be slightly smaller than the one or more corresponding air inlet ports, such that the plurality of air inlets may be inserted into the one or more corresponding air inlet ports.

7. The air box of claim 3, wherein a specific configuration of the plurality of air inlets may be varied so as to accommodate a particular make, model, and configuration of the engine for which the air box is to be utilized.

8. The air box of claim 1, wherein the seal is comprised of a molded pliable strip including a recess that is configured to receive the perimeter edge.

9. The air box of claim 1, wherein the seal is comprised of pliable stripping that is configured to be disposed around an interior of the perimeter edge, such that the pliable stripping fills a space between an interior of each of the plurality of air inlets and an exterior of the one or more corresponding air inlet ports.

10. The air box of claim 1, wherein the seal is comprised of pliable stripping that is configured to be disposed on an exterior of each of the plurality of air inlets, such that the pliable stripping fills a space between the exterior of each of the plurality of air inlets and an interior of the one or more corresponding air inlet ports.

11. A method for an air box to communicate an airstream through an air filter to an air intake duct of an internal combustion engine of a vehicle, comprising:
    configuring a housing to support the air filter within an interior of the housing, the housing comprising:
        a transparent portion configured to observe the air filter; and
        an edge portion coupled with a flat surface of an engine control unit, such that the ECU is placed in direct contact with the airstream;
    configuring a singular duct to direct the airstream to the air filter;
    forming a plurality of air inlets to the duct, wherein a first air inlet and a second air inlet each communicate air to the duct prior to the air entering the interior of the housing;
    providing a plurality of air inlet ports that correspond to the plurality of air inlets whereby the plurality of air inlet ports extend through the vehicle to a source of external air;
    providing at least a molded pliable strip seal disposed around a perimeter edge of each of the plurality of air inlets so as to establish a substantially air-leak resistant junction between the plurality of air inlets and the one or more corresponding air inlet ports;

providing a configuration and orientation to each of the one or more air inlets to facilitate coupling with one or more corresponding air inlet ports of the vehicle and a seal disposed around the perimeter of the air inlets to establish an air-leak resistant junction between the air inlet port and the air inlet; and extending a conduit from the interior of the housing to the air intake duct.

12. The method of claim 11, wherein forming the plurality of air inlets further comprises disposing a seal around a perimeter edge of each of the plurality of air inlets so as to establish a substantially air-leak resistant junction between the plurality of air inlets and the one or more corresponding air inlet ports.

13. The method of claim 11, wherein providing a configuration and orientation further comprises configuring either of the plurality of air inlets to be blocked to the airstream so as to facilitate operation of the air box in a vehicle that lacks either of the one or more corresponding air inlet ports.

* * * * *